US012804069B2

(12) United States Patent
Roh

(10) Patent No.: US 12,804,069 B2
(45) Date of Patent: Nov. 17, 2026

(54) METHOD AND APPARATUS FOR PROVIDING VOICE DIAL

(71) Applicants: HYUNDAI MOTOR COMPANY, Seoul (KR); KIA CORPORATION, Seoul (KR)

(72) Inventor: Jae Keun Roh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 271 days.

(21) Appl. No.: 18/891,894

(22) Filed: Sep. 20, 2024

(65) Prior Publication Data

US 2025/0365360 A1 Nov. 27, 2025

(30) Foreign Application Priority Data

May 21, 2024 (KR) ........................ 10-2024-0065755

(51) Int. Cl.
*H04M 1/27* (2006.01)
*H04M 1/57* (2006.01)
*H04M 1/60* (2006.01)

(52) U.S. Cl.
CPC ............. *H04M 1/271* (2013.01); *H04M 1/57* (2013.01); *H04M 1/6091* (2013.01); *H04M 2201/40* (2013.01); *H04M 2250/60* (2013.01)

(58) Field of Classification Search
CPC ...... H04M 1/271; H04M 1/57; H04M 1/6091; H04M 2201/40; H04M 2250/60
See application file for complete search history.

(56) References Cited

U.S. PATENT DOCUMENTS

| | | | | |
|---|---|---|---|---|
| 5,822,727 | A * | 10/1998 | Garberg | H04Q 3/42 379/88.16 |
| 2002/0065108 | A1* | 5/2002 | Tsukamoto | H04M 1/2745 455/566 |
| 2010/0062714 | A1* | 3/2010 | Ozaki | H04W 76/14 455/41.3 |
| 2012/0046046 | A1* | 2/2012 | Momiyama | G01C 21/3688 455/456.1 |
| 2015/0012261 | A1* | 1/2015 | Walther | G10L 13/08 704/9 |
| 2021/0297519 | A1* | 9/2021 | Saito | H04M 1/6091 |
| 2022/0407953 | A1* | 12/2022 | Sakamoto | H04M 1/2757 |

* cited by examiner

*Primary Examiner* — Junpeng Chen
(74) *Attorney, Agent, or Firm* — Lempia Summerfield Katz LLC

(57) ABSTRACT

A method and apparatus for providing voice dial. An aspect of the present disclosure provides a method for providing a voice dial, the method comprising: obtaining a phone book and a call history of a user, wherein the phone book and the call history include names and phone numbers of recipients; comparing a call history acquired in a present period with a call history acquired in a preceding period; determining whether a new call history exists, wherein the new call history is defined by a name or a phone number of a recipient exists in the call history acquired in the present period but does not exist in the call history acquired in the preceding period; checking a number of values included in a name field of the recipient in the phone book when the new call history exists; and modeling a pronunciation dictionary based on a new pattern combining the values based on a predetermined rule.

20 Claims, 6 Drawing Sheets

| Priority | Name | Confidence Score |
|---|---|---|
| 1 | James | 4000 |
| 2 | Jason | 3680 |
| 3 | Jameson | 3300 |
| 4 | Jaden | 2240 |
| 5 | Jane | 2000 |
| 6 | Johnson | 1960 |

FIG. 3A

METHOD AND APPARATUS FOR PROVIDING VOICE DIAL

CROSS-REFERENCE TO RELATED APPLICATION

This application claims the benefit of and priority to Korean Patent Application No. 10-2024-0065755, filed on May 21, 2024, the entire contents of which are incorporated herein by reference.

TECHNICAL FIELD

The present disclosure relates to a method and an apparatus for providing a voice dial.

BACKGROUND

The content described below simply provides background information related to the present embodiment and does not constitute the prior art.

Speech recognition technology, which receives human speech as input and converts it into text, is used in various fields. Speech recognition technology, being combined with Natural Language Understanding (NLU) and Natural Language Processing (NLP) technologies, is getting attention as an essential component for developing devices and systems for providing speech recognition-based services that understand user commands or requests in natural language and perform corresponding operations.

Artificial intelligence-based autonomous vehicles are emerging. In conjunction with the mobility industry, speech recognition technology that facilitates communication between vehicle occupants and artificial intelligence-based systems mounted within the vehicle is advancing together.

To improve user convenience, speech recognition technology, which accurately converts the user's voice utterances into text, is needed.

However, conventional speech recognition technology has a problem of inaccurately recognizing a recipient's name when a user makes a call through speech recognition.

In particular, because it may be difficult for safety reasons to manipulate a mobile phone during the driving of the vehicle, calls are often made using a speech recognition function built into the vehicle. In this case, the in-vehicle system often causes confusion by failing to accurately recognize the recipient's name uttered by the user.

Therefore, there is a need for a method and an apparatus for providing a voice dial that increases user convenience by more accurately recognizing the recipient's name.

SUMMARY

An object of the present disclosure is to provide a method and an apparatus for providing a voice dial.

More specifically, the object of the present disclosure is to provide a method and an apparatus for providing a voice dial, capable of more accurately recognizing the name of a recipient who has a call history with a user by generating different numbers of patterns based on the value and the number of special characters contained in the name field of the recipient in the phone book and modeling a pronunciation dictionary based on the generated patterns.

The technical objects of the present disclosure are not limited to those described above, and other technical objects not mentioned above should be understood clearly by those having ordinary skill in the art from the descriptions given below.

An embodiment of the present disclosure provides a method for providing a voice dial, the method comprising: obtaining a phone book and a call history of a user, wherein the phone book and the call history include names and phone numbers of recipients; comparing a call history acquired in a present period with a call history acquired in a preceding period; determining whether a new call history exists, wherein the new call history is defined by a name or a phone number of a recipient exists in the call history acquired in the present period but does not exist in the call history acquired in the preceding period; checking a number of values included in a name field of the recipient in the phone book when the new call history exists; and modeling a pronunciation dictionary based on a new pattern combining the values based on a predetermined rule.

Another embodiment of the present disclosure provides an apparatus for providing a voice dial, the apparatus comprising: at least one memory configured to store commands; and at least one processor, wherein, by executing the commands, the at least one processor is configured to: obtain a phone book and a call history of a user, wherein the phone book and the call history include names and phone numbers of recipients; compare a call history acquired in a present period with a call history acquired in a preceding period; determine whether a new call history exists, wherein the new call history is defined by a name or a phone number of a recipient exists in the call history acquired in the present period but does not exist in the call history acquired in the preceding period; check a number of values included in the name field of the recipient in the phone book when the new call history exists; and model a pronunciation dictionary based on a new pattern combining the values based on a predetermined rule.

According to one embodiment of the present disclosure, a method and an apparatus for providing a voice dial may be provided, which are capable of more accurately recognizing the name of a recipient having a call history with a user. The method and the apparatus may generate varying numbers of patterns based on the value contained in the name field of the recipient in the phone book and may model a pronunciation dictionary based on the generated patterns.

According to one embodiment of the present disclosure, a method and an apparatus for providing a voice dial may be provided, which improve user convenience. The method and the apparatus may display name candidates having a call history with the user among selected name candidates at a top of the screen when there are name candidates having a call history with the user exist, in the process of searching for and selecting name candidates corresponding to the user's utterance by using a modeled pronunciation dictionary.

According to one embodiment of the present disclosure, a method and an apparatus for providing a voice dial may be provided, which improve user convenience. The method and the apparatus may make a call directly to the recipient corresponding to the first name candidate with the highest confidence score among name candidates when the difference in confidence scores between the first name candidate and the second name candidate with the second highest confidence score is larger than or equal to a second threshold in the process of selecting name candidates.

According to one embodiment of the present disclosure, a method and an apparatus for providing a voice dial may be provided, which improve user convenience. The method and the apparatus may calculate the difference in confidence scores between neighboring name candidates when the name candidates are arranged in order of confidence score. The method and the apparatus may remove a specific name candidate from selected name candidates based on a predefined rule after comparing the calculated difference with a second threshold.

The technical effects of the present disclosure are not limited to the technical effects described above, and other technical effects not mentioned herein should be understood to those having ordinary skill in the art to which the present disclosure belongs from the description below.

BRIEF DESCRIPTION OF THE DRAWINGS

FIG. 3A is a figure illustrating a process of displaying name candidates having a call history with a user at the top of the screen according to one embodiment of the present disclosure.

DETAILED DESCRIPTION

Figure 1:
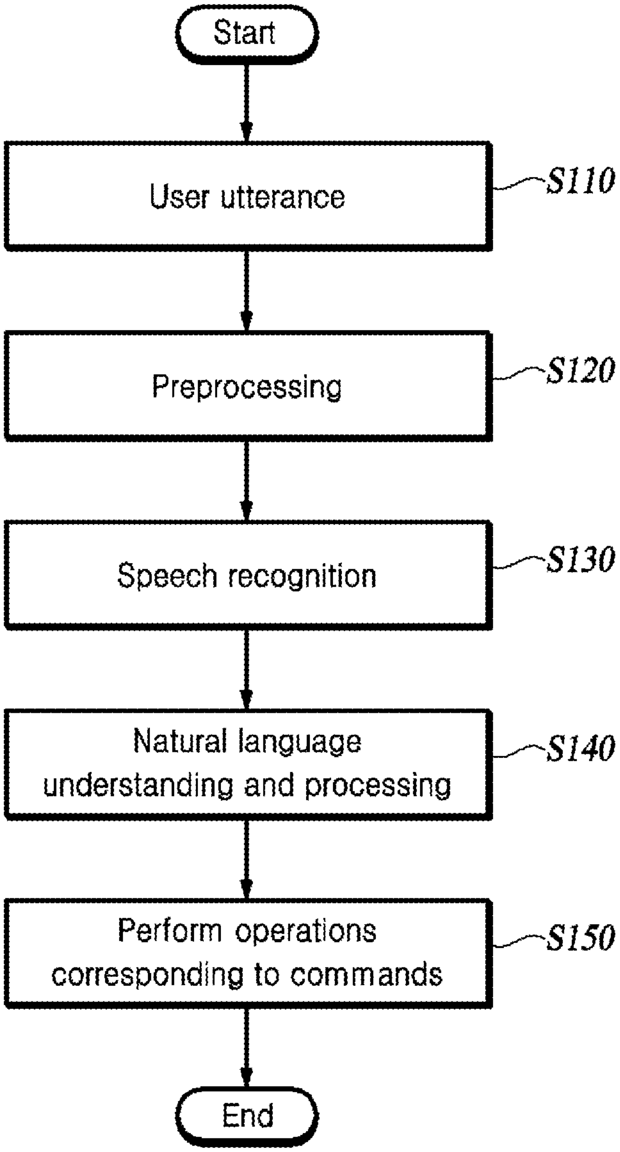
FIG. 1 is a flow diagram illustrating a method for providing a speech recognition-based service according to one embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

The following detailed description, together with the accompanying drawings, is intended to describe exemplary embodiments of the present invention, and is not intended to represent the only embodiments in which the present invention may be practiced.

In the present disclosure, voice dialing refers to a calling method where the user verbally instructs a call number instead of manually dialing the phone number of the intended recipient, the user's utterance is recognized, and a call to the recipient's number is initiated automatically based on the user's instruction.

FIG. 1 is a flow diagram illustrating a method for providing a speech recognition-based service according to one embodiment of the present disclosure.

Referring to FIG. 1, the speech recognition-based service may be provided through receiving user utterances (S110), performing preprocessing (S120), performing speech recognition (S130), performing natural language understanding and processing (S140), and performing operations corresponding to commands (S150).

The user's utterance generally refers to voice but may also include text. The user's utterance includes the user's question or request.

Preprocessing (S120) may extract features from the user's voice and may convert the voice into text. The preprocessing result may be a spectrogram.

Speech recognition (S130) may refer to the process of converting the user's utterance into text. When the user's utterance is voice, the speech recognition may refer to the process of converting the voice into text.

An acoustic model (AM), a language model (LM), and a pronunciation dictionary (lexicon) may be used for speech recognition (S130). Here, the acoustic model is a model that calculates the probability between a voice feature and a phoneme.

The acoustic model listens to the sound and calculates the probability for each phoneme, such as "Is this 'Ah (/a/)'? or 'I (/i/)'?"

The pronunciation dictionary is a dictionary that deals with the relationship between a phoneme sequence and a word. The pronunciation dictionary is a list of words (i.e., grapheme) and pronunciations (i.e., phoneme), such as "Through: /th/r/oo/."

The language model calculates the likelihood of a word being spoken. For example, if a preceding word is "nice," the next word is more likely to be "weather" than "date." Regardless of the similarity of utterances, the language model calculates which word is more likely to appear in the current context.

Speech recognition modeling may be performed based on GMM-HMM, which combines the Hidden Markov Model (HMM) and the Gaussian Mixture Model (GMM). Speech recognition modeling may be performed based on DNN-HMM, which replaces the Gaussian mixture model with a deep learning model such as a deep neural network (DNN).

The GMM-HMM and DNN-HMM based speech recognition system consists of the acoustic model, the language model, and the pronunciation dictionary as separate and independent modules. Speech recognition is performed as the decoder integrates the independent modules.

Speech recognition modeling may be based on an end-to-end model (E2E model) that models the acoustic model, language model, and pronunciation dictionary as a single artificial neural network.

The E2E model-based speech recognition system consists of or comprises the acoustic model, language model, and pronunciation dictionary in one module, and the one module performs speech recognition.

Natural language understanding and processing S140 may be a process of classifying user intention and slots included in the input text using at least one natural language understanding engine.

Natural language understanding and processing S140 may be a process of extracting information, such as a domain, a named entity, and a speech act from input text using at least one natural language understanding engine and extracting intent and slots based on the extracted result.

The domain is information for identifying the subject of utterances. For example, a domain representing various topics, such as vehicle control, information provision, text transmission, and navigation function, may be determined based on the input text.

The entity name represents a proper noun, such as a person's name, a place name, an organization name, time, date, and currency. Named Entity Recognition (NER) is the task of identifying an entity name in a sentence and determining the type of the identified entity name. Through recognition of the entity name, important keywords may be extracted from a sentence to understand the meaning of the sentence.

A speech act refers to an action that a speaker shows in a sentence. For example, "I am reading a book" represents a statement speech act, "Are you reading a book?" represents a question speech act, and "Read a book" represents an imperative act.

The natural language understanding engine segments the input sentence into morphemes, projects the morphemes into a vector space, clusters the projected vectors, classifies the intent of the user (speaker) indicated by the input sentence, extracts components corresponding to slots of the intent in the input sentence, and sets the extracted components as entities.

The step of performing operations S150 corresponding to a command may be the operations performed as an information provision system, such as providing a response that matches the intent of the user's utterance, accessing a database and searching for information to provide a response that matches the intent of the user's utterance, and performing conversion into a format suitable for the Audio Video Navigation Telematics (AVNT) scenario for providing the response. In addition, the performing of the operations S150 corresponding to the command may include operations performed as a vehicle control system, such as adjusting the indoor environment (e.g., the vehicle temperature) or adjusting driving parameters related to the vehicle's speed and steering.

The method for voice dialing according to one embodiment of the present disclosure may be included in the speech recognition S130.

Figure 2:
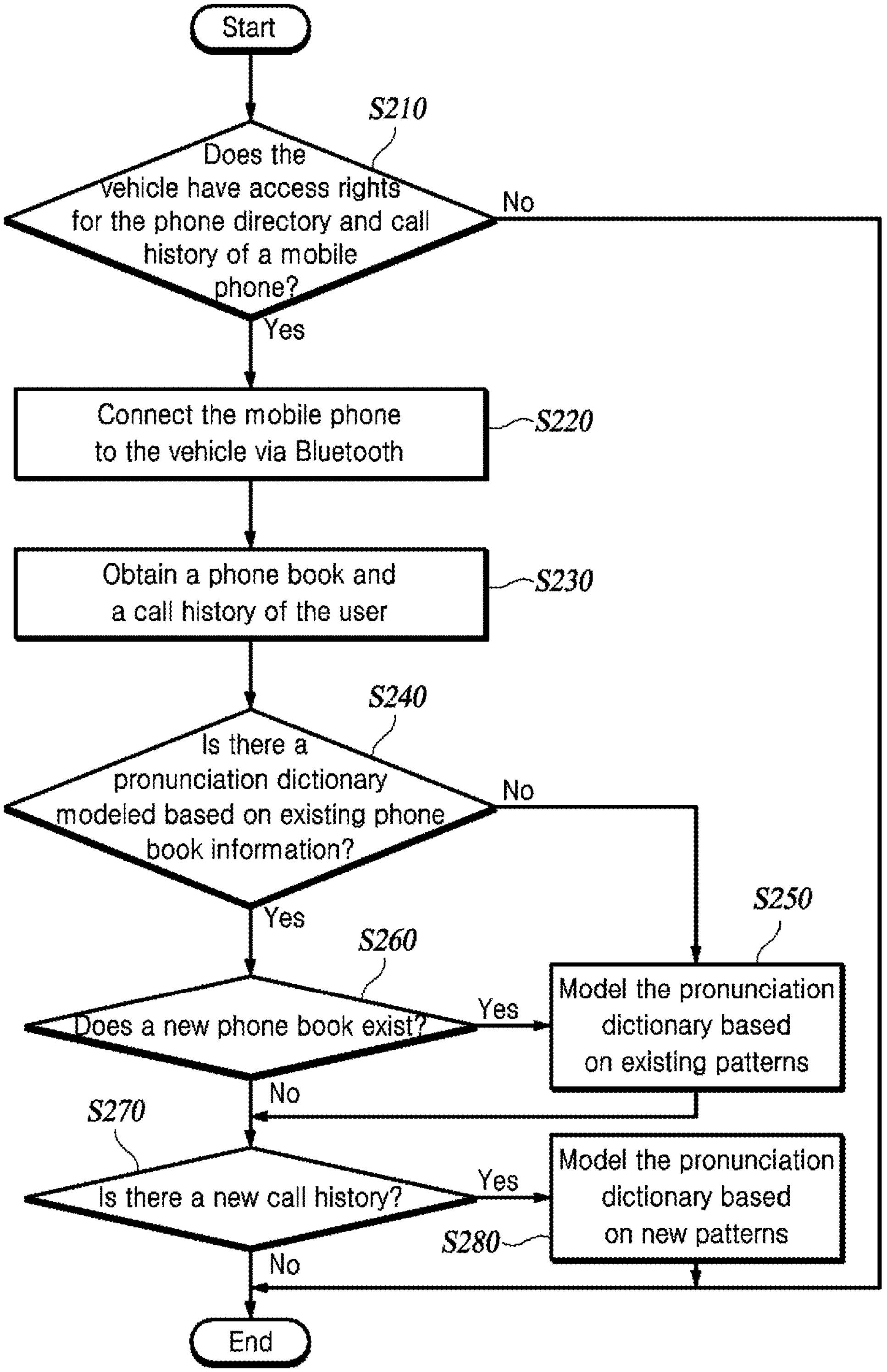
FIG. 2 is a flow diagram illustrating a method for voice dialing according to one embodiment of the present disclosure.

FIG. 2 is a flow diagram illustrating a method for voice dialing according to one embodiment of the present disclosure.

A user, such as a vehicle driver or a vehicle passenger, attempts to connect, for example, a mobile phone to the vehicle (not shown). A Bluetooth connection may be used to connect the mobile phone to the vehicle.

When the user's attempt is detected, the processor, for example, the controller determines whether the vehicle has access rights for the phone directory and call history (S210).

If it is determined that the vehicle has access rights to the phone book and call history of the mobile phone, the processor connects the mobile phone to the vehicle via Bluetooth (S220). When the mobile phone is connected to the vehicle via Bluetooth, the processor obtains the phone book and call history of the user's mobile phone (S230).

The processor determines whether there is a pronunciation dictionary, that is user dictionary, modeled based on existing phone book information of the mobile phone (S240).

When it is determined that there is no pronunciation dictionary modeled based on the existing phone book information of the mobile phone (No in S240), the pronunciation dictionary is modeled based on the existing pattern (S250).

Modeling a pronunciation dictionary means constructing a pronunciation dictionary. In the process of constructing a pronunciation dictionary, Grapheme-to-Phoneme (G2P) conversion, which converts graphemes into phonemes, may be necessary. A pronunciation dictionary consists of or comprises graphemes and corresponding phonemes. Therefore, constructing a pronunciation dictionary may include collecting a list of graphemes and phonemes, identifying relationships between graphemes (string) and phonemes (phoneme sequence), creating a list of corresponding phonemes for each grapheme, and organizing them in a dictionary form. The speech recognition model may convert phonemes into graphemes according to the grapheme-phoneme rules defined in the pronunciation dictionary.

An existing pattern refers to a pronunciation dictionary construction method used in the prior art. For example, by G2P conversion, the string of 'grandfathers' may be converted into a phoneme sequence '/g/r/ae/n/d/f/aa/dh/er/z.' In this case, a grapheme-phoneme list may be created by mapping each grapheme to its corresponding phoneme: grapheme g to phoneme /g/, grapheme r to phoneme/r/, grapheme a to phoneme /ae/, grapheme n to phoneme /n/, grapheme d to phoneme/d/, grapheme f to phoneme /f/, grapheme a to phoneme/aa/, grapheme th to phoneme/dh/, grapheme er to phoneme /er/, and grapheme s to phoneme /z/.

When it is determined that there is a pronunciation dictionary modeled with existing phone book information of the mobile phone (Yes in S240), the processor determines whether there is a new phone book (S260).

A new phone book refers to the changes in the phone book acquired in the present period from the phone book acquired in the preceding period when the phone book acquired in the preceding period is compared with the phone book acquired in the present period. In general, changes in the phone book acquired in the present period from the phone book acquired in the preceding period mean additions to the phone book in the present period compared to the phone book acquired in the preceding period. Typically, the additions include contact information. Contact information may include names and phone numbers.

The preceding period and the present period are distinguished based on the time when the user's mobile phone is connected to the vehicle via Bluetooth. If the vehicle is currently connected to the user's mobile phone via Bluetooth, the preceding period refers to the most recent time in the past, excluding the present, when the mobile phone was connected to the user's vehicle via Bluetooth.

The existing phone book of the mobile phone is the same as the phone book acquired in the preceding period. In other words, the existing phone book of the mobile phone is the phone book of the mobile phone from the most recent time, excluding the present, when the mobile phone was connected to the user's vehicle via Bluetooth.

When it is determined that there is a new phone book (Yes in S260), the processor models the pronunciation dictionary based on the existing pattern (S250). The meaning of modeling a pronunciation dictionary is the same as described above. In other words, the modeling of the pronunciation dictionary may be a process of updating the pronunciation dictionary by adding new names or phone numbers to the pronunciation dictionary when a new phone book becomes available alongside a pronunciation dictionary modeled based on existing phone book information. Because phone numbers are typically numerical, the processor adds the corresponding graphemes and phonemes of the name to the pronunciation dictionary.

When it is determined that no new phone book is available (No in S260), the processor determines whether there is a new call history (S270).

A new call history refers to the part added to the call history acquired in the present period compared to the call history acquired in the previous period. Typically, newly added portions include contact information. Contact information may include names and phone numbers.

When it is determined that a new call history is available (Yes in S270), the pronunciation dictionary is modeled based on a new pattern (S280).

The new pattern refers to a method for constructing a pronunciation dictionary proposed by the method for providing a voice dial according to one embodiment of the present disclosure. Table 1 illustrates a new pattern according to an embodiment of the present disclosure. Referring to Table 1, the processor generates a different number of patterns depending on the number of values included in the recipient's name field. The values labeled as A, B, C, and so on in Table 1 represent parts of the recipient's name. For example, if the recipient's name is 'John Doe,' the user may have stored the recipient's name as 'John' or 'John Doe' in the phone book of the mobile phone.

In what follows, an example of a new pattern according to the recipient's name stored by the user is described.

i) If the user stores the recipient's name as 'John,' a single value included in the name field is John. According to Table 1, John is the value corresponding to A, and therefore, one new pattern, John, is created. The string 'John' and the corresponding phoneme string, a total of 1 pair, may be added to the pronunciation dictionary.

ii) If the user stores the recipient's name as 'John Doe,' the two values included in the name field are John and Doe. According to Table 1, 'John' is the value corresponding to A, and 'Doe' is the value corresponding to B; therefore, four new patterns are created: John, Doe, John Doe, and Doe John. Spacing may be used as a criterion for distinguishing the number of values included in the name field. Alternatively, the number of values included in the name field may be distinguished based on specific fields, such as first name, middle name, and last name. A total of four pairs, composed of the strings John, Doe, John Doe, and Doe John, along with their corresponding phoneme strings, may be added to the pronunciation dictionary.

TABLE 1

| Number of values included in the name field | Number of new patterns |
|---|---|
| 1 (A) | 1 (A) |
| 2 (A, B) | 4 (A, B, AB, BA) |
| 3 (A, B, C) | 7 (A, B, C, AB, BC, AC, ABC) |

The new pattern differs from the existing pattern in that, even if only one name is stored in the phone book is one, the pronunciation dictionary is constructed by creating a plurality of patterns and adding a plurality of string (grapheme)-phoneme sequence (phoneme) pairs to the pronunciation dictionary.

For example, if the user stores the recipient's name as 'John Doe,' the two values included in the name field are John and Doe. According to the existing pattern, only one is created, namely John Doe. A total of one pair, consisting of the string John Doe and the corresponding phoneme string, may be added to the pronunciation dictionary. The new pattern is distinguished from the existing pattern described above in that the new pattern adds a total of four pairs comprising the strings John, Doe, John Doe, and Doe John, each paired with its corresponding phoneme string.

In other words, the new pattern supports a larger number of patterns than the existing pattern, leading to the construction of a comprehensive pronunciation dictionary and, as a result, improving the accuracy of speech recognition.

Table 2 illustrates a new pattern when three or more values are included in the name field according to one embodiment of the present disclosure. Referring to Table 2, when the recipient's name field contains three or more values, the processor generates a pattern according to the same rule as applied when the name field contains three values. In other words, seven patterns are generated.

Specifically, three or more values included in the name field are classified into three groups. The last value is classified as C, the second to last value is classified as B, and all other values are classified as A.

For example, if the values included in the name field are a, b, c, and d, there are four values included in the name field. According to the rule above, d is classified as C, c as B, a and b as A, and patterns corresponding to A, B, C, AB, BC, AC, and ABC are generated. Therefore, as shown in Table 2, seven new patterns are generated: ab, c, d, abc, cd, abd, and abcd.

In another example, if the values included in the name field are a, b, c, d, e, and f, there are six values included in the name field. According to the rule above, f is classified as C, e as B, a to d as A, and patterns corresponding to A, B, C, AB, BC, AC, and ABC are generated. Therefore, as shown in Table 2, seven new patterns are generated: abcd, e, f, abcde, ef, abcdf, and abcdef.

TABLE 2

| Number of values included in the name field | Number of new patterns |
|---|---|
| 4 (a, b, c, d) | 7 (ab, c, d, abc, cd, abd, abcd) |
| 6 (a, b, c, d, e, f) | 7 (abcd, e, f, abcde, ef, abcdf, abcdef) |

Table 3 illustrates special characters that may be replaced with texts according to one embodiment of the present disclosure. As shown in Table 3, some special characters may be replaced with specific texts according to predetermined rules.

The processor may consider the replaced text as the value included in the name field and may generate a new pattern according to the value and the number of special characters included in the name field.

For example, if the user stores the recipient's name as 'John Doe,' ♡ the values and a special character included in the name field are John, Doe, and ♡. ♡ may be substituted with 'heart.' Therefore, seven new patterns are generated: John, Doe, Heart, John Doe, Doe Heart, John Heart, and John Doe Heart. A total of 7 pairs comprising the strings John, Doe, heart, John Doe, Doe heart, John heart, and John Doe heart, each paired with its corresponding phoneme string, may be added to the pronunciation dictionary.

TABLE 3

| Special character | Text substitution |
|---|---|
| ♡ | 'Heart' |
| :) or :-) | 'Smiling face' |
| ! | 'Exclamation mark' |
| @ | At the rate' |
| ? | 'Question mark' |
| ☆ | 'Star' |
| # | 'Hash' |
| $ | 'Dollar' |
| % | 'Percentage' |
| & | 'And' |
| + | 'Plus' |

If the recipient's name includes a prefix, a new pattern is generated by removing the prefix from the value included in the recipient's name field.

Prefixes may include Director, Dr., Miss, Mr., Mrs., Ms., Professor, and QC. For example, if a user changes the recipient's name to 'Mr. John Doe,' the two values included in the name field are John and Doe, excluding the prefix. Therefore, four new patterns are generated: John, Doe, John Doe, and Doe John.

If the recipient's name includes a suffix (postfix), a new pattern is generated by removing the suffix from the value included in the recipient's name field, along with an additional pattern generated in addition to the generated new pattern.

Suffixes may include jr., sr., junior, and senior. For example, if the user stores the recipient's name as 'John Doe junior,' the two values included in the name field are John and Doe, excluding the suffix. Therefore, four new patterns are generated: John, Doe, John Doe, and Doe John. To reflect the suffix, an additional pattern is generated in addition to the new patterns generated. Because the suffix is junior, two additional patterns are generated: John Doe junior and Doe junior.

In another example, if the user stores the recipient's name as 'John Frederick Doe junior,' the three values included in the name field are John, Frederick, and Doe, excluding the suffix. Therefore, four new patterns are generated: John, Frederick, Doe, John Frederick, Frederick Doe, John Doe, and John Frederick Doe. To reflect the suffix, an additional pattern is generated in addition to the new patterns generated. Because the suffix is junior, three additional patterns are generated: Frederick Doe junior, John Doe junior, and John Frederick Doe junior.

FIG. 3A is a figure illustrating a process of displaying name candidates having a call history with a user at the top of the screen according to one embodiment of the present disclosure.

Figure 3B:
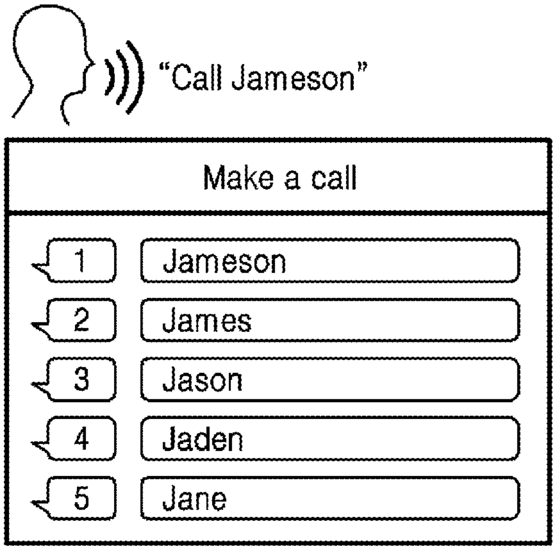
FIG. 3B is a figure illustrating a process of displaying name candidates having a call history with a user at the top of the screen according to one embodiment of the present disclosure.

FIG. 3B is a figure illustrating a process of displaying name candidates having a call history with a user at the top of the screen according to one embodiment of the present disclosure.

A confidence score is a measure indicating the reliability of speech recognition results. The confidence score may be calculated by the processor. For example, the confidence score may be defined as the likelihood that a recognized phoneme or word is correct, relative to the probability that the utterance originates from another phoneme or word. The confidence score may be expressed as a value between 0 and 1, or as a value between 0 and 10,000, which is not limited to the specific value.

The confidence score may be used as a criterion for giving priority to name candidates. For example, name candidates may be sorted in the descending order of confidence scores.

A threshold may be used as a criterion for selecting a name candidate. For example, the threshold may serve as a criterion for selecting which name candidate to display when presenting name candidates to the user. A method for displaying name candidates may use one or more of Audio Video Navigation Telematics (AVNT) scenarios.

The processor may search for name candidates corresponding to the user's voice using the modeled pronunciation dictionary and may obtain a confidence score for each name candidate. The processor may sort the name candidates in descending order based on their confidence scores. In the case of FIG. 3A and FIG. 3B, the user's voice is "Call Jameson." FIG. 3A shows name candidates, confidence scores, and a sorting result.

The processor may select name candidates whose confidence score is equal to or greater than a first threshold. In the case of FIGS. 3A and 3B, because the first threshold is 2000, five name candidates out of six name candidates are selected. The selection result includes James, Jason, Jameson, Jaden, and Jane.

The processor determines whether a name candidate having a call history with the user exists among the name candidates, and if there are name candidates having a call history with the user, the processor displays the name candidates at the top of the screen. In the case of FIG. 3A and FIG. 3B, the name candidate having a call history with the user is Jameson. Therefore, although Jameson would be displayed third based on the order of confidence score, Jameson is displayed at the top of the screen due to the call history with the user. FIG. 3B shows an example of how name candidates are displayed on the screen.

Figure 4:
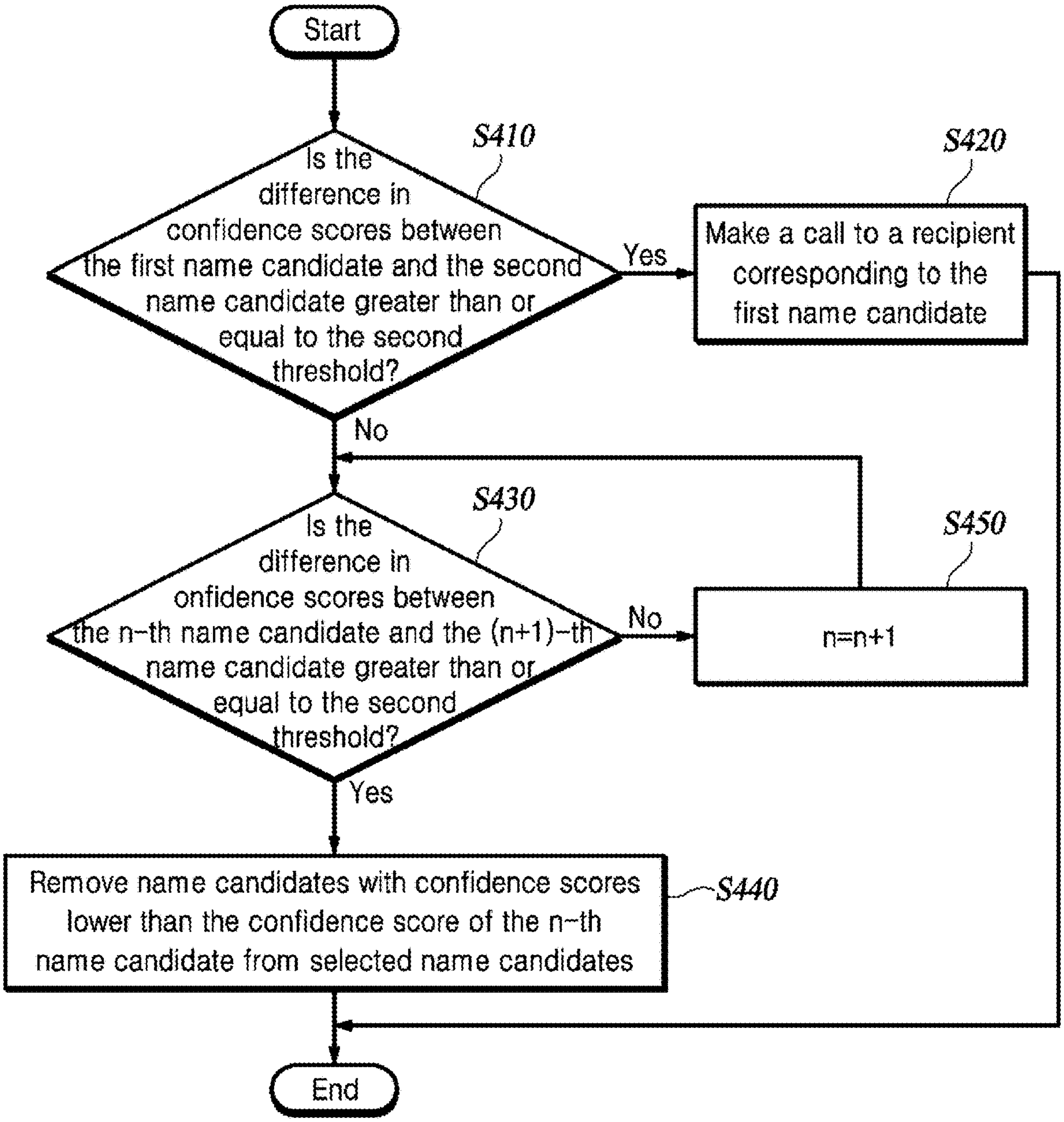
FIG. 4 is a flow diagram illustrating a method for selecting name candidates according to one embodiment of the present disclosure.

FIG. 4 is a flow diagram illustrating a method for selecting name candidates according to one embodiment of the present disclosure.

The processor may use a modeled pronunciation dictionary to search for name candidates corresponding to the user's voice and may obtain a confidence score for each name candidate (not shown). The processor may select name candidates whose confidence scores are equal to or greater than a first threshold (not shown).

The processor calculates the difference between the confidence score of the first name candidate and the confidence score of the second name candidate and determines whether the difference is greater than or equal to a second threshold (S410).

When the difference between the confidence score of the first name candidate with the highest confidence score and the confidence score of the second name candidate with the second highest confidence score is determined to be greater than or equal to the second threshold (Yes in S410), the processor makes a call to the recipient corresponding to the first name candidate (S420).

When name candidates are sorted in order of confidence scores, and the first name candidate with the highest confidence score is significantly greater than the confidence score of the second name candidate with the second highest confidence score, the processor does not display the name candidates other than the first name candidate to the user but directly makes a call to the first name candidate, thereby improving user convenience.

When it is determined that the difference between the confidence score of the first name candidate with the highest confidence score and the confidence score of the second name candidate with the second highest confidence score is less than the second threshold (No in S410), the processor calculates the difference between the confidence score of the n-th name candidate with the n-th highest confidence score and the confidence score of the (n+1)-th name candidate with the (n+1)-th highest confidence score and determines whether the difference is greater than or equal to the second threshold (S430). Here, n is a natural number greater than or equal to 2.

When it is determined that the difference is greater than or equal to the second threshold (Yes in S430), name candidates whose confidence score is lower than that of the n-th name candidate are removed from the selected name candidates (S440).

When it is determined that the difference is less than the second threshold (No in S430), n becomes n+1 (S450). The method performs the S430 step again. For example, assume that the difference between the confidence scores of the first name candidate and the second name candidate is less than the second threshold, and n=2. The processor calculates the difference between the confidence scores of the second name candidate and the third name candidate. In what follows, examples corresponding to the case where the difference between the confidence scores of the second name candidate and the third name candidate is greater than or equal to the second threshold and the case where the difference is less than the second threshold are described.

i) When it is determined from the calculation that the difference between the confidence scores of the second name candidate and the third name candidate is greater than or equal to the second threshold, name candidates whose confidence score is lower than the confidence score of the second name candidate are removed from the selected name candidates. In other words, among the selected name candidates, all name candidates except the first name candidate and the second name candidate are removed. Only the first name candidate and the second name candidate may be displayed to the user.

ii) When it is determined from the calculation that the difference between the confidence scores of the second name candidate and the third name candidate is less than the second threshold, the difference between confidence scores of the third name candidate and the fourth name candidate is calculated, and the difference is checked whether it is greater than or equal to the second threshold. In other words, when name candidates are sorted in the descending order according to their confidence scores, the S430 step is repeated until the difference between confidence scores of consecutive name candidates is greater than or equal to the second threshold.

When the difference between confidence scores of consecutive name candidates, except for the first and second name candidates, is significantly large, the process may not display the name candidates with low confidence scores to the user, thereby improving user convenience.

Figure 5:
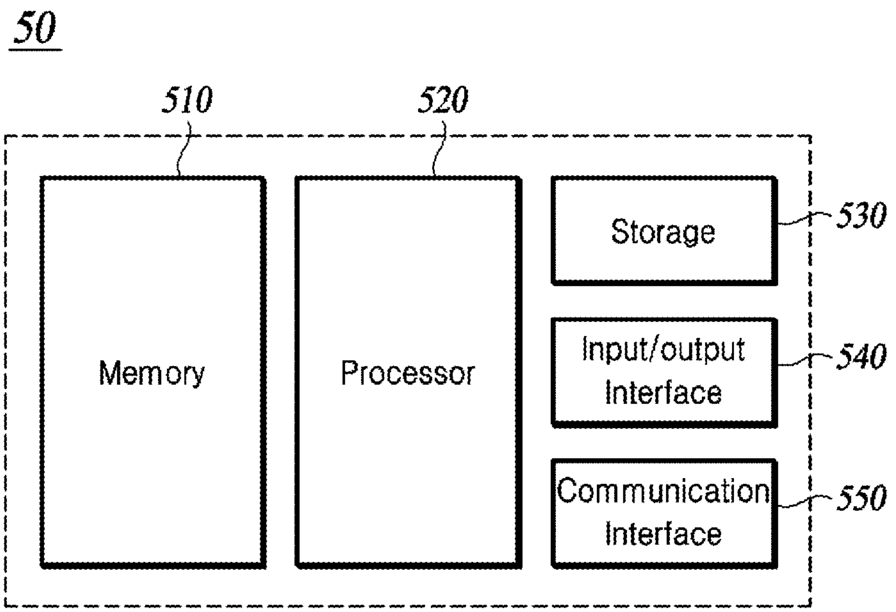
FIG. 5 is a block diagram illustrating a computing device that may be used for implementing a method or an apparatus according to the present disclosure.

FIG. 5 is a block diagram illustrating a computing device that may be used for implementing a method or an apparatus according to the present disclosure.

The computing device 50 may include all or part of a memory 510, a processor 520, a storage 530, an input/output interface 540, and a communication interface 550. The computing device 50 may be a stationary computing device, such as a desktop computer or a server, or a mobile computing device, such as a laptop computer or a smart phone. The computing device 50 may include a specialized hardware accelerator capable of processing operations of an artificial intelligence model in an efficient manner. For example, the computing device 50 may include a graphic processing unit (GPU), a tensor processing unit (TPU), or a neural processing unit (NPU).

The memory 510 may store a program that enables the processor 520 to perform methods or operations according to various embodiments of the present disclosure. For example, a program may include a plurality of instructions executable by the processor 520, and the methods or operations described above may be performed by executing the plurality of instructions by the processor 520. The memory 500 may consist of or comprise a single memory or a plurality of memories. In this case, information required to perform the methods or operation according to various embodiments of the present disclosure may be stored in a single memory or distributed across a plurality of memories. When the memory 510 is composed of or comprises a plurality of memories, the plurality of memories may be physically separated. The memory 510 may include at least one of volatile memory and non-volatile memory. Volatile memory includes Static Random Access Memory (SRAM) or Dynamic Random Access Memory (DRAM), while non-volatile memory includes flash memory.

The processor 520 may include at least one core capable of executing at least one instruction. The processor 520 may execute instructions stored in the memory 510. The processor 520 may consist of a single processor or a plurality of processors.

The storage 530 maintains stored data even if power supplied to the computing device 50 is cut off. For example, the storage 530 may include non-volatile memory or may include a storage medium such as a magnetic tape, an optical disk, or a magnetic disk. A program stored in the storage 530 may be loaded into the memory 510 before being executed by the processor 520. The storage 530 may store files written in a program language, and a program created from the files by a compiler may be loaded into the memory 510. The storage 530 may store data to be processed by the processor 520 and/or data processed by the processor 520.

The input/output interface 540 may provide an interface with an input device such as a keyboard or a mouse and/or an output device such as a display device or a printer. The user may trigger execution of a program by the processor 520 through the input device and/or check the processing results of the processor 520 through the output device.

The communication interface 550 may provide access to an external network. The computing device 50 may communicate with other devices through the communication interface 550.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. A method for providing a voice dial, the method comprising:

obtaining a phone book and a call history of a user, wherein the phone book and the call history include names and phone numbers of recipients;

comparing a call history acquired in a present period with a call history acquired in a preceding period;

determining whether a new call history exists, wherein the new call history is defined by a name or a phone number of a recipient exists in the call history acquired in the present period but does not exist in the call history acquired in the preceding period;

checking a number of values included in a name field of the recipient in the phone book when the new call history exists; and modeling a pronunciation dictionary based on a new pattern combining the values based on a predetermined rule.

2. The method of claim 1, wherein modeling the pronunciation dictionary comprises:

generating a different number of patterns based on the number of values.

3. The method of claim 2, wherein generating the different number of the patterns comprising:

generating one pattern when the name field of the recipient has one value;

generating four patterns when the name field of the recipient has two values; and generating seven patterns when the name field of the recipient has three or more values.

4. The method of claim 2, wherein modeling the pronunciation dictionary comprises:

generating a different number of the patterns based on the number of values and special characters, when the name of the recipient includes special characters replaceable with text.

5. The method of claim 2, wherein modeling the pronunciation dictionary comprises:

generating the patterns by removing a prefix from a value included in the name field of the recipient, when the name of the recipient includes the prefix; and generating the patterns by removing a postfix from a value included in the name field of the recipient, when the name of the recipient includes the postfix.

6. The method of claim 1, further comprising:

searching for at least one name candidate corresponding to a voice of the user using a pronunciation dictionary modeled;

acquiring a confidence score for each name candidate; and selecting name candidates whose confidence scores are greater than or equal to a first threshold.

7. The method of claim 6, further comprising:

assigning priority to the name candidate based on the call history.

8. The method of claim 7, wherein assigning the priority comprises:

determining whether name candidates having a call history with the user exist among the name candidates; and displaying name candidates having a call history with the user at a top of a screen when selected name candidates are displayed to the user by using the screen, when there are name candidates having a call history with the user exist.

9. The method of claim 6, wherein selecting the name candidates comprises:

calculating a difference in confidence scores between a first name candidate with a highest confidence score and a second name candidate with a second highest confidence score among the name candidates; and making a call to the recipient corresponding to the first name candidate when the difference in confidence scores between the first name candidate and the second name candidate is calculated to be greater than or equal to a second threshold.

10. The method of claim 6, further comprising:

calculating a difference in confidence scores between an n-th name candidate with an n-th highest confidence score and an (n+1)-th name candidate with the (n+1)-th highest confidence score among selected name candidates;

when the difference is greater than or equal to a second threshold, removing name candidates having the confidence scores lower than the confidence score of the n-th name candidate among the selected name candidates, from the selected name candidates; and when the difference is less than the second threshold, calculating a difference in confidence scores between the (n+1)-th name candidate and an (n+2)-th name candidate having the (n+2)-th highest confidence score, wherein n is a natural number greater than or equal to 2.

11. An apparatus for providing a voice dial, the apparatus comprising:

at least one memory configured to store commands; and at least one processor, wherein, by executing the commands, the at least one processor is configured to:

obtain a phone book and a call history of a user, wherein the phone book and the call history include names and phone numbers of recipients;

compare a call history acquired in a present period with a call history acquired in a preceding period;

determine whether a new call history exists, wherein the new call history is defined by a name or a phone number of a recipient exists in the call history acquired in the present period but does not exist in the call history acquired in the preceding period;

check a number of values included in the name field of the recipient in the phone book when the new call history exists; and model a pronunciation dictionary based on a new pattern combining the values based on a predetermined rule.

12. The apparatus of claim 11, wherein the at least one processor is further configured to:

generate a different number of patterns based on the number of values.

13. The apparatus of claim 12, wherein the at least one processor is further configured to:

generate one pattern when the name field of the recipient has one value;

generate four patterns when the name field of the recipient has two values; and generate seven patterns when the name field of the recipient has three or more values.

14. The apparatus of claim 12, wherein the at least one processor is further configured to:

generate a different number of the patterns based on the number of values and special characters, when the name of the recipient includes special characters replaceable with text.

15. The apparatus of claim 12, wherein the at least one processor is further configured to:

generate the patterns by removing a prefix from a value included in the name field of the recipient, when the name of the recipient includes the prefix; and generate the patterns by removing a postfix from a value included in the name field of the recipient, when the name of the recipient includes the postfix.

16. The apparatus of claim 11, wherein the at least one processor is further configured to:

search for at least one name candidate corresponding to a voice of the user using a pronunciation dictionary modeled;

acquire a confidence score for each name candidate; and select name candidates whose confidence scores are greater than or equal to a first threshold.

17. The apparatus of claim 16, wherein the at least one processor is further configured to:

assign priority to the name candidate based on the call history.

18. The apparatus of claim 17, wherein the at least one processor is further configured to:

determine whether name candidates having a call history with the user exist among the name candidates; and display name candidates having a call history with the user at a top of a screen when selected name candidates are displayed to the user by using the screen, when there are name candidates having a call history with the user exist.

19. The apparatus of claim 16, wherein the at least one processor is further configured to:

calculate a difference in confidence scores between a first name candidate with a highest confidence score and a second name candidate with a second highest confidence score among the name candidates; and make a call to the recipient corresponding to the first name candidate when the difference in confidence scores between the first name candidate and the second name candidate is calculated to be greater than or equal to a second threshold.

20. The apparatus of claim 16, wherein the at least one processor is further configured to:

calculate a difference in confidence scores between an n-th name candidate with an n-th highest confidence score and an (n+1)-th name candidate with the (n+1)-th highest confidence score among selected name candidates;

when the difference is greater than or equal to a second threshold, remove name candidates having the confidence scores lower than the confidence score of the n-th name candidate among the selected name candidates, from the selected name candidates; and when the difference is less than the second threshold, calculate a difference in confidence scores between the (n+1)-th name candidate and an (n+2)-th name candidate having the (n+2)-th highest confidence score, wherein n is a natural number greater than or equal to 2.

* * * * *